United States Patent [19]

Parker et al.

[11] Patent Number: 4,516,851

[45] Date of Patent: May 14, 1985

[54] VELOCITY MEASUREMENT

[76] Inventors: John C. Parker, 56 Stirling Rd., Edinburgh 5; James A. Blake, 11 Fingzies Pl., Leith Links, Edinburgh, both of Scotland

[21] Appl. No.: 361,841

[22] Filed: Mar. 26, 1982

[30] Foreign Application Priority Data

Mar. 26, 1981 [GB] United Kingdom .................. 8109469

[51] Int. Cl.³ .............................................. G01P 3/36
[52] U.S. Cl. ........................................ 356/28; 356/152
[58] Field of Search ................................... 356/28, 152

[56] References Cited

U.S. PATENT DOCUMENTS

| 3,018,555 | 1/1962 | Willey et al. | 356/28 |
| 3,804,518 | 4/1974 | Meyr | 356/28 |
| 4,309,104 | 1/1982 | Prinz et al. | 356/28 |

FOREIGN PATENT DOCUMENTS 1249302 10/1971 United Kingdom .................. 356/28

Primary Examiner—S. C. Buczinski
Attorney, Agent, or Firm—Kerkam, Stowell, Kondracki & Clarke

[57] ABSTRACT

Apparatus for measuring the velocity of, for example, an aircraft includes two optical units spaced a predetermined distance apart along an axis, there being a plurality of pairs of associated radiation detectors, with each pair of detectors having one detector in each unit, the planes of lines of sight of each pair of detectors extending parallel to each other, with these planes of different pairs of detectors being inclined relative to each other, in a measurement period, comparing means of the apparatus determining the delay between the forward and aft detectors of at least one pair of detectors receiving radiation from the same part of the same portion of the plane of a radiation source, such as the terrain, and from this determination the velocity being represented, the comparing means possibly comprising a known form of correlator, possibly provided by a digital computer, the computer possibly also providing axis transformation means within the apparatus.

20 Claims, 4 Drawing Figures

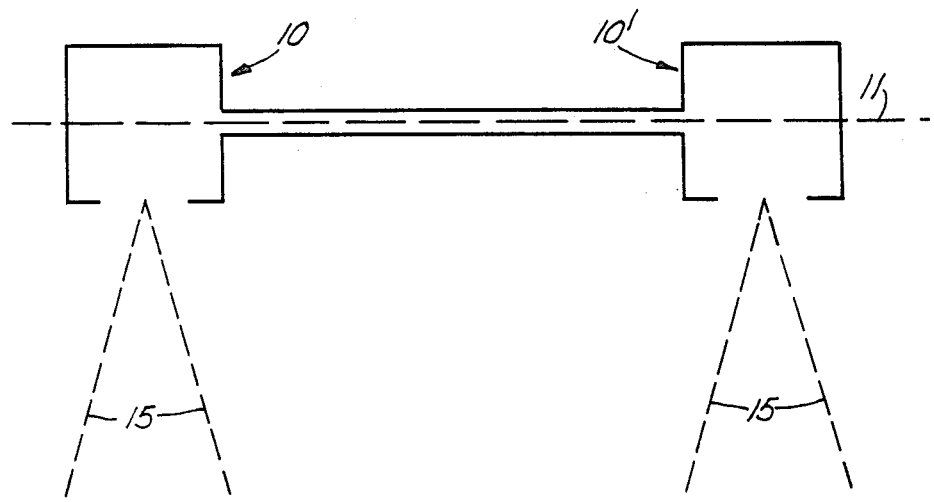
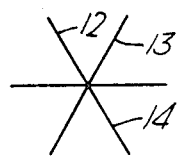
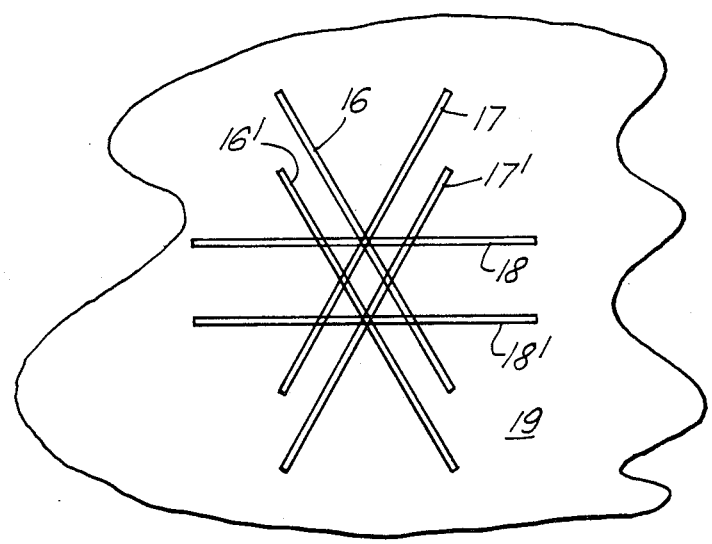

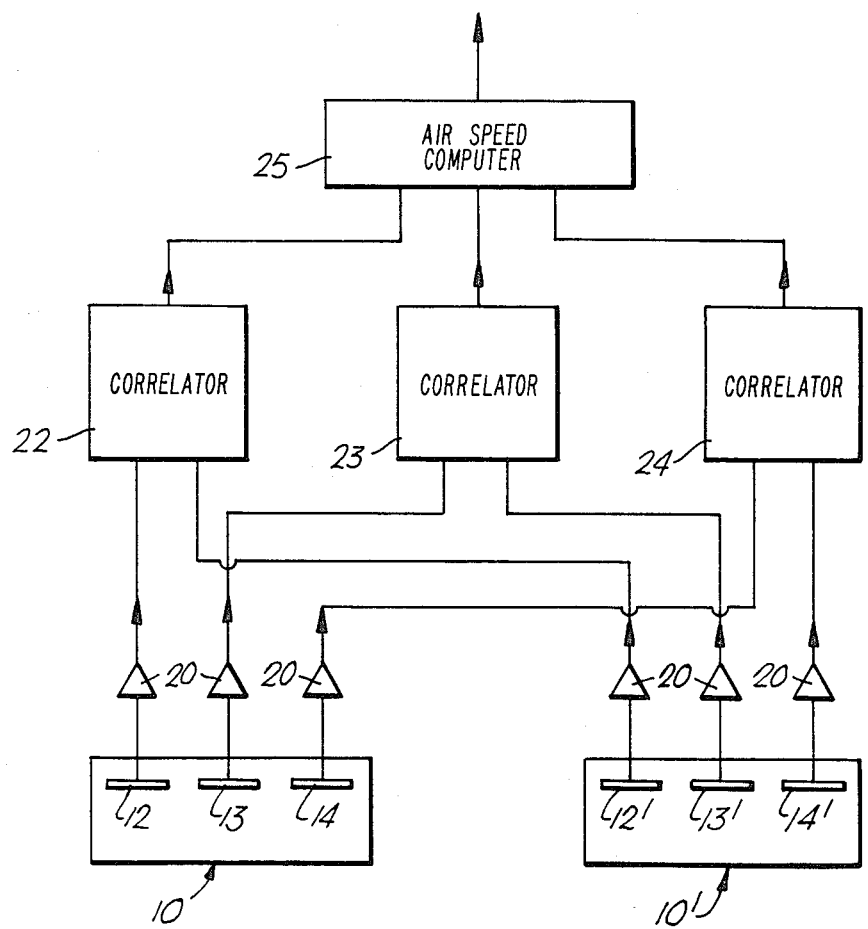

VELOCITY MEASUREMENT

This invention relates to apparatus for determining the velocity of an object, and particularly for determining an aircraft's groundspeed.

It is an object of the present invention to provide apparatus to measure the velocity of an object in relation to two orthogonal axes in a plane.

According to the present invention apparatus for measuring the velocity of an object in relation to two orthogonal axes in a plane, by the apparatus receiving radiation from an associated source in the plane, includes two optical units in a different plane, either the source, or the two optical units at least of the apparatus, are to move with the object in the same plane, each unit includes at least two crossed detectors, with each detector being arranged to receive radiation instantaneously exclusively from an elongated, linearly-extending portion of the plane including the source, but not receiving radiation if the plane portion does not include the source, the different detectors of the unit being arranged to receive radiation from portions of the plane including the source inclined, i.e., oriented, relative to each other, in each unit each detector having an associated detector in the other unit, each associated pair of detectors being arranged to receive radiation simultaneously from two, corresponding, parallel, spaced portions of the plane including the source, the longitudinal axes of symmetry of each two, corresponding, parallel portions of the plane being spaced apart by the same predetermined distance, along an axis parallel to the axis between the two spaced optical units, the apparatus also includes comparing means to receive signals representative of the detected intensities of radiation in a measurement period, different comparing means to receive signals from different pairs of associated detectors, with each comparing means to receive signals exclusively from one pair of associated detectors, in the measurement period each associated pair of detectors being arranged to receive radiation instantaneously from a plurality of two, corresponding, parallel portions of the plane including the source, and in order that the velocity of the object at least partially can be determined, at least one associated pair of detectors being arranged to receive radiation from at least the same part of the same portion of the plane including the source in the measurement period, each comparing means being arranged to determine in the measurement period the delay between any detection, by both of the pair of associated detectors from which it receives signals of radiation from at least the same part of the same portion of the plane including the source, and the apparatus includes means to compute the object's velocity from signals representative of each delay determined by the different comparing means in the measurement period.

Apparatus in accordance with the present invention is simple and compact.

The detection of radiation from elongated, linearly extending portions of the plane including the source enables the apparatus to be accurate in operation. Each such portion is required to be as narrow in the direction of the object's motion as possible, commensurate with the detected radiation having sufficient energy for the apparatus to operate satisfactorily. It is also required that the elongated portions of the plane including the source each should be long enough for the total radiation energy to be received by the corresponding detector in a measurement period also to be sufficient for the apparatus to operate satisfactorily.

Usually, but not essentially, each detector is arranged to receive radiation instantaneously exclusively from a straight, elongated portion of the plane including the source.

Also, usually, but not essentially, in relation to each optical unit, the associated portions of the plane including the source are inclined relative to each other about their mid-points.

Usually, but not essentially, the object's velocity in each of successive measurement periods is determined, from signals representative of each determined delay in each measurement period supplied by the different comparing means.

Each measurement period is such that each comparing means can determine only one delay, considered to be the mean delay throughout the measurement period.

It is not essential that the source and the optical units are spaced apart by a fixed distance. Each measurement period desirably is short compared with the rate of change of the angle of inclination between the plane including the source, and the plane including the two optical units. In this specification and the accompanying claims the phrases "the plane including the source", and "the plane including the two optical units", refer to the mean locations of such planes in each measurement period.

There are planes of sight lines associated with the apparatus, in each measurement period the planes of sight lines extending from each two corresponding portions of the plane including the source are required to be parallel with each other, and to be spaced apart by the predetermined distance along an axis parallel to the axis between the two optical units. Each such plane of sight lines extending from the plane including the source may include the appropriate detector, each pair of associated detectors, and the two optical units, being spaced apart by the same predetermined distance as each two corresponding parallel portions of the plane including the source. However, an optical system, and/or an arrangement of optical fibres, may be provided between the detectors and the parallel planes of sight lines extending from each two corresponding portions of the plane including the source, so that such planes of sight lines do not include the detectors, but instead include what can be considered to be the effective radiation-receiving surfaces of the detectors, spaced from the detectors, and provided by the optical system or optical fibres. For convenience, in this specification and the accompanying claims, references to the axis between the two optical units, and to the predetermined distance between each pair of associated detectors, and between the two optical units, refer to the axis, and to the predetermined distance, between the effective radiation-receiving surfaces of the detectors included in the planes of sight lines extending from the portions of the plane including the source, where appropriate.

When the two optical units move with the object they are mounted on the object.

When the associated source is to move with the object, at least a part of the object may comprise the source.

The means to compute the objects' velocity may be provided by a known form of digital computer.

If the straight longitudinal axes of symmetry of two inclined portions of the plane including the source, and associated with an optical unit, are not wholly parallel with the two orthogonal axes in relation to which the objects' velocity is to be determined, the means to compute the objects' velocity is required to include axis transformation means. Usually, but not essentially, when there are two straight portions of the plane including the source, these portions are inclined at right angles to each other.

When there are only two associated pairs of detectors in the apparatus, if the direction of the objects' movement is at least substantially parallel to one of the two inclined portions of the plane including the source, and associated with each optical unit, it is not possible to determine the objects' velocity relative to this inclined portion of the plane.

There may be three associated pairs of detectors in the apparatus, and the apparatus may be arranged, in relation to each optical unit, such that the associated portions of the plane including the source are equi-angularly inclined relative to each other. The provision of three associated pairs of detectors ensures that the objects' velocity can be determined relative to both orthogonal axes. The means to compute the objects' velocity is required to include axis transformation means when three associated pairs of detectors are provided.

For any construction of apparatus in accordance with the present invention the associated source may emit, and the detectors of the apparatus may be responsive to, any form of radiation, for example, infra-red radiation.

When the two optical units are mounted on the object to move therewith, and the associated source is to be stationary, the apparatus may be arranged to be employed with a source sufficiently extensive in the plane, or the planes, in which the source extends, such that radiation is to be received by the apparatus over a large number of measurement periods, irrespective of different, possible, directions of movement of the object, the source to emit radiation at different intensities over its extensive area, different intensities of emitted radiation to be detected by the apparatus, and each comparing means comprises a known form of correlator. Each correlator of the apparatus may be provided by a known form of digital computer.

It is a further object of the present invention to provide such apparatus, as referred to in the preceding paragraph, which apparatus, when used in combination with the aircraft's compass, is to measure the groundspeed of an aircraft, in relation to two orthogonal axes in the general plane of the terrain over which the aircraft instantaneously is flying. The two optical units are arranged to be mounted on the aircraft, and the apparatus is arranged to receive radiation from the terrain. The means to compute the aircraft's velocity from the apparatus in accordance with the present invention may be arranged to supply signals to an associated navigational computer system. Hence, if the apparatus in accordance with the present invention, in combination with the aircraft's compass, measures the groundspeed of the aircraft sufficiently accurately, the associated navigational computer system may be capable of deriving the aircraft's position by dead reckoning sufficiently accurately.

The terrain comprises an extensive source of, say, infra-red radiation, the intensity of emitted infra-red radiation is variable over the terrain, and such infra-red radiation is to be detected by the detectors mounted on the aircraft.

When the apparatus is mounted on the object, such as an aircraft, and is arranged to detect radiation from an extensive source, if the direction of movement of the object changes between consecutive measurement periods, the two orthogonal axes in relation to which the objects' velocity is determined may change correspondingly, and in different measurement periods there are different two orthogonal axes. With such an arrangement, references in this specification and the accompanying claims to the two orthogonal axes are to such axes in each measurement period. Usually axis transformation means of the means to compute the object's velocity makes the appropriate correction for any change in the object's direction between consecutive measurement periods in response to input signals from, say, a compass.

In an alternative arrangement, the two optical units of the apparatus are to be stationary, and the associated radiation source is to move with the object.

With other forms of apparatus each is arranged such that the associated radiation source is to move with the object, and the two optical units are to move in a manner corresponding to the object's movement, possibly, in each measurement period, the two optical units are to be displaced by the same extent as the object, in a direction parallel to, and spaced from, the direction of the object's displacement.

The present invention will now be described by way of example with reference to the accompanying drawings, in which:

FIG. 1 shows the arrangement of two optical units included in one embodiment of apparatus in accordance with the present invention, the apparatus to measure an aircraft's ground speed in relation to two orthogonal axes, FIG. 2 shows the relative arrangement of three detectors included in each of the two optical units of the apparatus of FIG. 1, FIG. 3 shows the relative arrangement of the fields of view of all the detectors of the apparatus, and FIG. 4 is a block diagram of the apparatus, indicating comparing means to receive the outputs of the detectors and means to compute the aircraft's velocity from signals received from the comparing means.

The illustrated apparatus is to measure an aircraft's ground speed, and includes, as shown in FIG. 1, two identical optical units indicated generally at 10 and 10', spaced apart by a predetermined distance, conveniently, of 1 meter, along an axis, in a plane 11 indicated by a dotted line. Each optical unit 10 or 10' includes three, identical, elongated, straight, infra-red detectors, each of a known form, the detectors of the unit 10 being indicated generally at 12, 13 or 14 in FIG. 2. The detectors 12, 13 and 14 are defined by masks (not shown), are equi-angularly inclined, i.e., oriented, in relation to each other, and intersect, i.e., cross at their mid-points.

The detectors, 12 13 and 14 of the optical unit 10 are also indicated in FIG. 4, where, for the sake of clarity, they are represented by three co-axial lines. The detectors of the optical unit 10' are only indicated in FIG. 4, by three co-axial lines 12', 13' and 14', although in their optical unit they are also arranged in the form indicated in FIG. 2, and are identical to the detectors 12, 13 and 14.

The lines of sight of the detectors are indicated generally by the dotted lines 15 in FIG. 1. However, the lines of sight extending from each detector extend in a plane normal to the detector, and in FIG. 3 are shown the relative positions of the identical, straight fields of view 16, 17, 18 and 16', 17', 18', respectively, of the detectors 12, 13, 14 and 12', 13' and 14', in a plane 19 spaced from the apparatus. The illustrated fields of view associated with the two optical units 10 and 10' are shown as overlapping, but this is not essential. In relation to each optical unit, the associated fields of view, in any plane at least substantially parallel to the plane 11, are equiangularly inclined relative to each other, intersect at their mid-points, and have the same width-to-length ratio as the identical detectors. Each detector is arranged to receive radiation instantaneously and exclusively from the associated portion of the plane including the source, and comprising the field of view of the detector in this plane. For convenience, the plane including the source can be considered to be the illustrated plane 19.

In each optical unit each detector has an associated detector in the other unit, each associated pair of detectors, 12, 12'; 13, 13' and 14, 14' being arranged to receive infra-red radiation simultaneously from two, corresponding, parallel, spaced portions of the plane 19, respectively, 16, 16'; 17, 17' and 18, 18'. The longitudinal axes of symmetry of each two such corresponding straight parallel portions of the plane 19 are spaced apart by the predetermined distance of 1 meter, along an axis parallel to the axis extending between the two optical units. In relation to each pair of associated detectors, the planes of sight lines between the detectors and the two corresponding portions of the plane 19 are parallel to each other, and are spaced apart by the predetermined distance of 1 meter.

The illustrated apparatus measures an aircraft's ground speed by receiving infra-red radiation from the terrain over which the aircraft instantaneously is flying, the detectors 12, 13, 14 and 12', 13', 14' being arranged to be responsive to this radiation, and the apparatus being mounted on the aircraft with the optical units 10 and 10' spaced along a fore-and-aft axis of the aircraft, the unit 10 comprising the forward unit.

At any instant the general plane of the terrain can be considered to be the plane 19 of FIG. 3, and initially the aircraft will be considered to be flying parallel with this plane.

The terrain comprises an extensive area source emitting infra-red radiation, the intensity of the emitted infra-red radiation varying over the terrain. Hence, at any time, the intensity of infra-red radiation detected by the six detectors of the apparatus differs.

As the aircraft moves, at different times, the three pairs of associated detectors each simultaneously receive radiation from different two corresponding portions of the plane 19.

If initially the aircraft is considered to be flying at right angles to the pair of associated detectors 14 and 14', there is a delay between the aft detector 14' receiving and detecting the radiation from, say, the portion 18 of the plane 19, compared with the forward detector 14 receiving and detecting the radiation from the portion 18. By measuring this delay the ground speed of the aircraft at right angles to the longitudinal axis of symmetry of the portion 18 can be determined. This delay, in relation to a measurement period of the apparatus, is determined in the following manner.

As shown in FIG. 4, which is a block diagram of the complete apparatus mounted on the aircraft, the signals from each detector are supplied individually to an amplifier 20. Then the signals from the associated pair of detectors 14 and 14' are supplied individually to comparing means comprising a known form of correlator indicated generally at 24, and provided by a known form of digital computer. Within the measurement period there are detected by the associated pair of detectors the intensities of infra-red radiation emitted by 128 two corresponding portions of the plane 19, at 128 equally spaced sampling times, and the detected intensities are stored in digital form within the optical units, by means not shown. The 128 two corresponding portions of the plane 19 comprise the illustrated portions 18 and 18', and portions parallel thereto. The intensities detected by the forward detector 14 can be considered to be $A_1 \ldots A_{128}$, and the corresponding intensities detected by the aft detector 14' can be considered to be $B_1 \ldots B_{128}$. If the aircraft's velocity at right angles to the longitudinal axes of symmetry of the two corresponding portions 18 and 18' of the plane 19 can only be positive, conveniently, the first half of the intensities detected by the aft detector 14' in the measurement period can be discarded. Signals representative of the non-discarded stored values are then supplied to the correlator 24, which forms the products $A_1B_{65}, A_2B_{66} \ldots A_{64}B_{128}$, and stores the sum of these products $S_1$. The correlator then forms the products $A_2B_{65}, A_3B_{66} \ldots A_{65}B_{128}$, and stores the sum of these products $S_2$, and so on until the products $A_{65}B_{65}, A_{66}B_{66} \ldots A_{128}B_{128}$ are formed, and the sum of these products $S_{65}$ is stored. The correlator then determines the peak $S_M$ of the stored sums $S_1 \ldots S_{65}$.

The delay between the aft detector 14' receiving and detecting the radiation from the portion 18 of the plane 19, compared with the forward detector 14 receiving and detecting the radiation from the portion 18, is equal to (65-M) intervals between consecutive sampling times.

The radiation from the portion 18 may not be received by the forward detector 14 in any of the 1st to 65th sampling times. However, there are 64 of the 128 portions of the plane 19 of the radiation emitted from which portions is detected by both of the associated pair of detectors, and the detected radiation intensities of which form the products giving the peak sum $S_M$ stored in the correlator.

Not all the radiation intensities detected by the forward detector 14 are also detected by the aft detector 14', and vice versa. Further, possibly, not all the same radiation intensities, emitted from the same portions of the plane 19, and detected by both the forward and aft detectors are employed to obtain the value $S_M$, because of the discarded values of the detected radiation intensities.

The correlator 24 supplies a signal representative of the determined delay to means 25 to compute therefrom the aircraft speed at right angles to the portions 18 and 18' of the plane 19, the means 25 also being provided by the digital computer. The speed is equal to the reciprocal of (65-M) intervals between consecutive sampling times, and if this term is determined in seconds, the speed is determined in meters per second.

For the aircraft's ground speed to be determined most accurately $M=1$, and the determined delay is equal to half the measurement period.

With 128 equally spaced sampling times in each measurement period, a maximum correlation accuracy of 1% can be obtained.

If the aircraft is flying at right angles to the longitudinal axes of symmetry of the pair of associated detectors 12 and 12', and to the two corresponding portions 16 and 16' of the plane 19, the intensities of radiation detected by the detectors 12 and 12', in each of 128 sampling times of the measurement period, after being stored in digital form, are supplied to comparing means comprising a correlator 22 which is arranged to operate in the same way as the correlator 24, as described above. Again, a signal representative of the determined delay is supplied to the common means 25 to compute the aircraft's ground speed. Similarly, if the aircraft is flying at right angles to the longitudinal axes of symmetry of the pair of associated detectors 13 and 13', and to the two corresponding portions 17 and 17' of the plane 19, comparing means comprising a correlator 23 is provided, and is arranged to operate in the same way as the correlators 22 and 24, and the common means 25 computes the aircraft's ground speed. Each of the three correlators 22, 23 and 24 is provided by the digital computer.

Because there are three equi-angularly inclined associated pairs of detectors operating simultaneously in the apparatus there is at least a component of the aircraft's velocity at right angles to the longitudinal axes of symmetry of at least two of the associated pairs of detectors, irrespective of the direction of movement of the aircraft. Hence, it is possible to determine the aircraft's velocity in relation to two orthogonal axes in the plane 19, irrespective of the direction of movement of the aircraft, the common means 25 to compute the aircraft's velocity including axis transformation means, and computing the aircraft's velocity from delays determined by at least two of the three correlators in relation to the measurement period.

If the aircraft can have a positive or a negative velocity at right angles to the longitudinal axes of symmetry of any pair of associated detectors, the optical units may be arranged to discard the radiation intensities detected, for example, in the first and latter quarter of the sampling times of the measurement period by the aft detector of each such appropriate pair of associated detectors, instead of the arrangement described above, in which the radiation intensities detected in the first half of the sampling times by the aft detector are discarded. The associated correlator forms the products $A_1B_{33}$, $A_2B_{34} \ldots A_{64}B_{96}$ and stores the sum $S_1$, forms the products $A_2B_{33}$, $A_3B_{34} \ldots A_{65}B_{96}$ and stores the sum $S_2$, and so on until the products $A_{65}B_{33}$, $A_{66}B_{34} \ldots A_{128}B_{96}$ are formed, and the sum $S_{65}$ is stored. The correlator again determines the peak $S_M$, and the delay determined by the correlator is equal to (33-M) intervals between consecutive sampling times. Because M can have a value up to 65, this term can be either positive or negative. A fraction other than a quarter of the sampling times may be so discarded at the beginning, and at the end, of the measurement period, in relation to the aft detector, there being different fractions at the beginning and at the end of the measurement period.

When the sense of the aircraft's velocity, along a direction at right angles to the longitudinal axes of symmetry of a pair of associated detectors, changes, the initial forward detector is then considered to be the aft detector, and vice versa.

In relation to each pair of associated detectors, it is not required that the whole of the same portion of the plane 19 is detected by both the forward and aft detectors, it being sufficient that only a part of same portion of the plane 19 is detected by both detectors. Hence, it is advantageous that the optical units are arranged to cause some of the intensities of radiation detected in the measurement period to be replaced by appropriate constant values, for example, the detected intensities in the first quarter of the sampling times by the forward detector, and the detected intensities in the latter quarter of the sampling times by the aft detector. The arrangement adopted in this respect is such that, under any normally encountered operating condition for the aircraft, the appropriate correlations are more accurately obtained by such substitutions, than would otherwise be the case. A fraction other than a quarter of the sampling times may be so substituted at the beginning, and at the end, of the measurement period, respectively, in relation to the forward and the aft detectors. Such substitution at the end of the measurement period in relation to the aft detector is of stored radiation intensities not discarded as referred to above.

It is required that the radiation intensity of at least a significant part of the same portion of the plane 19 is detected by both the forward and aft detectors.

Because the apparatus is arranged to detect radiation from elongated, linearly extending portions of the terrain, the apparatus is accurate in operation. Each such portion is required to be as narrow in the direction of the aircraft's motion as possible, commensurate with the detected radiation having sufficient energy for the apparatus to operate satisfactorily. It is also required that the elongated portions of the plane including the source each should be long enough for the total radiation energy to be received by the corresponding detector in a measurement period also to be sufficient for the apparatus to operate satisfactorily.

Because the measurement period can be short, for example, comprising one second, and because the terrain comprises an extensive source of the infra-red radiation detected by the detectors, it is possible to determine the aircraft's groundspeed, in relation to the two orthogonal axes, in each of a large number of successive measurement periods. The two orthogonal axes change in correspondence with any change of the aircraft's direction between consecutive measurement periods, but, in each measurement period, there are relevant two orthogonal axes. Usually the axis transformation means of the means to compute the aircraft's velocity makes the appropriate correction for any change in the aircraft's direction between consecutive measurement periods, in response to input signals from the aircraft's compass.

Each measurement period is such that each correlator can determine only one delay, considered to be the mean delay throughout the measurement period.

It is not required to know the aircraft's height in order to compute its groundspeed. Further, it is not essential that the aircraft's height is constant whilst its groundspeed is being determined.

The angle of inclination between the plane including the source, i.e. the plane of the terrain, and the plane including the optical units, i.e. the plane including the fore-and-aft axis of the aircraft, can vary between consecutive measurement periods. Variations in the topography of the terrain are unimportant. The roll attitude of the aircraft does not affect the determination of the aircraft's groundspeed for up to ±70° of roll. The pitch angle of the aircraft does affect the determination of the groundspeed, and errors so introduced into successive determinations of the groundspeed will not average out over a journey. Consequently, it may be desirable to correct for any such error introduced into the determination of the aircraft's groundspeed due to the pitch attitude of the aircraft.

Each measurement period is short compared with the rate of change of the angle of inclination between the planes referred to in the preceding paragraph. Conveniently, the phrases "the plane including the source", and "the plane including the two optical units", can refer to the mean locations of such planes in each measurement period.

It is desirable that the measurement period is short enough for each determined delay at least to approach its maximum possible value, the delay approaching the value of the first part of the term from which the aircraft's groundspeed is computed, for example, if the term is (33-M) the maximum delay is 33 intervals between consecutive sampling times. Hence, it is convenient to arrange that, as the aircraft's speed changes, the durations of the measurement periods change so that this criterion is obtained. Thus, the apparatus is required to track any change in the aircraft's groundspeed.

In relation to each determination of the aircraft's groundspeed there may be measurement periods of different durations for the different associated pairs of detectors, in accordance with the angle of inclination of the longitudinal axes of symmetry of the detectors to the fore-and-aft axis of the aircraft, although generally the ratios between these different measurement periods remain constant.

If the aircraft's groundspeed at right angles to the longitudinal axis of any associated pair of detectors is at least substantially zero, or if tracking is lost, long measurement periods must be employed, to obtain inaccurate determinations of the aircraft's groundspeed, until accurate tracking is established. Further, the fraction of the radiation intensities detected by the aft detector discarded at the beginning, and at the end, of each measurement period may vary; and/or the fraction of the radiation intensities detected by the forward detector at the beginning of each measurement period, and the fraction of the undiscarded radiation intensities detected by the aft detector at the end of each measurement period, and for which constant values are substituted, may vary.

In general, it can be considered that, each correlator operates upon line pictures of the infra-red radiation emitted by the terrain in each measurement period, each line extending at right angles to the longitudinal axes of symmetry of the appropriate associated pairs of detectors, the line having a width equal to the length of the detectors, there being two lines, one for each detector of the associated pair. The line pictures can be considered to be represented by digitised waveforms, and the correlator requires the D.C. and L.F. components of both waveforms to be discarded, or filtered off, so that the waveforms become "re-shaped", and bipolar. Thus, the products formed by the correlator are bipolar. Uncorrelated line picture waveforms cause the sums of the products formed by the correlator to tend towards zero. When fully correlated, the line picture waveforms cause the corresponding sum $S_M$ of the products to be positive, and to have a maximum value, such correlation being caused by introducing the appropriate delay before the signals from the forward detector are operated upon by the signals from the aft detector, to form the required products within the correlator. Optimum filtering, to re-shape the line picture waveforms, may be of a more complex form than envisaged above, giving the best signal-to-noise ratio, and enabling the aircraft groundspeed to be determined most accurately.

The accuracy of each measurement of the aircraft's groundspeed is also dependent upon the accuracy with which each two corresponding planes of sight lines extending from the plane, or the planes, including the terrain are provided to extend parallel to each other; is dependent upon the accuracy with which the predetermined distance between each such two corresponding planes of sight lines is known; is dependent upon the accuracy with which each delay is determined by the different correlators in each measurement period; and is dependent upon each measurement period being as short as conveniently can be arranged, consistent with each determined delay being obtained as accurately as possible by the apparatus, under the instantaneous conditions applying to the movement of the aircraft.

The sensitivity of the apparatus decreases as the height of the aircraft increases, because there are increasing amounts of overlap of the fields of view of the fore and aft detectors. Hence, as only the information that is not instantaneously common to the two detectors can be employed to determine the aircraft's groundspeed, there is increasingly less radiation energy received by the detectors which can be used for the purpose of making a velocity measurement.

Further, any departure from the planes of the lines of sight of each associated pair of detectors being precisely parallel with each other also causes the accuracy of the apparatus to decrease as the height of the aircraft increases.

Signals from the means 25 to compute the aircraft's groundspeed, and representative of the determined aircraft's groundspeed in relation to the two orthogonal axes, may be supplied to a known form of navigational computer. The apparatus in accordance with the present invention, in combination with the aircraft's compass, is required to measure the groundspeed of the aircraft sufficiently accurately to enable the associated navigational computer system to derive the aircraft's position by dead reckoning sufficiently accurately.

The apparatus in accordance with the present invention is simple and compact, for example, because the constituent detectors of the apparatus each is not extensive in area; and inherently because only a single axis between the two optical units is provided within the apparatus.

Further, the apparatus inherently has an accurate manner of operation, even over long periods.

An additional advantage of the apparatus for measuring the aircraft's groundspeed as described above is that it is not required for the apparatus to radiate electromagnetic waves.

The narrow fields of view of the detectors, instead of being defined by masks, may be defined by the shape of each detector, or may be defined by employing bundles of optical fibres, radiation received by adjacent fibre ends being transmitted by the fibres to be incident upon the detectors.

The detectors may be responsive to, and arranged to receive any form, or combination of forms, of electromagnetic waves, instead of, or in addition to, infra-red radiation, for example, visible light and/or microwaves.

Each optical unit may include only two linearly-extending detectors, possibly arranged at right angles to each other. However, such an arrangement is not able to compute the aircraft velocity in relation to two orthogonal axes, when the aircraft's direction is at least substantially parallel to the longitudinal axis of symmetry of one associated pair of detectors, because under such a condition this associated pair of detectors produces signals which are not correlatable. Thus, the provision of three associated pairs of detectors in the apparatus is advantageous.

Each optical unit may include an image intensifier or image intensifiers to increase the accuracy of the apparatus when used with low intensity radiation.

A third optical unit may be provided in the apparatus at a smaller distance from one of the units than the other unit is from said one unit, and along the axis between the first and second optical units. The third optical unit is identical with either the first or second optical unit, and is arranged so that it can replace said other unit, the apparatus operating in the required manner employing the third optical unit and said one optical unit optical unit. Thus, the apparatus has a smaller predetermined distance between the two units so employed, than when the first and second units are employed. With the aircraft flying at low heights, the combination of the third unit and said one unit is arranged to ensure that the fields of view of the fore and aft detectors overlap within a measurement period, if this criterion cannot be ensured by employing the first and second units. Such replacement also is advantageous when the aircraft is flying at low speed, because the measurement periods which can be used are less when the third unit and said one unit are employed.

Instead of providing a third optical unit, the fields of view of the detectors may be varied appropriately during the operation of the apparatus for example, by varying the lengths of the detector masking slits, or by varying the inclination of the slits along their own lengths.

It is not essential that the planes of sight lines extending from the plane including the source also include the detectors. An optical system, and/or an arrangement of optical fibres, may be provided between the detectors and the parallel planes of sight lines extending from each two corresponding portions of the plane including the source, so that such planes of sight lines do not include the detectors, but instead include what can be considered to be the effective radiation-receiving surfaces of the detectors, spaced from the detectors and provided by the optical system or optical fibres. For convenience, in this specification and the accompanying claims, references to the axis between the two optical units, and to the predetermined distance between each pair of associated detectors, and between the two optical units, refer to the axis and to the predetermined distance, between the effective radiation-receiving surfaces of the detectors included in the planes of sight lines extending from the portions of the plane including the source, where appropriate.

Further, for convenience, in this specification it is considered that the longitudinal axes of symmetry of each two corresponding portions of the plane including the source are spaced apart by the predetermined distance along an axis parallel to the axis extending between the two optical units.

An additional optical unit may be provided, the additional optical unit having one detector, but otherwise closely resembling either the first or second optical unit. However, the arrangement of the additional optical unit is such that the plane of the lines of sight of its detector is inclined at a fixed angle to the plane of the lines of sight of an associated detector of the first or second optical unit about a horizontal axis. The additional optical unit is arranged so that it can operate with either the first or second optical unit. Alternatively, such an additional optical unit is provided by an additional detector in one of the first and second optical units, the part of an optical system provided between the detectors of said one optical unit and the source being such that the plane of the lines of sight received by the additional detector is inclined to the plane of the lines of sight of the associated detector of the other optical unit. Thus, the additional detector can be considered to be an additional optical unit. When the additional optical unit operates with either the first or second optical unit, the apparatus operates in the same manner as when the planes of the lines of sight of associated detectors are parallel with each other, but the arrangement is such that the angular velocity of the aircraft relative to the ground is determined. Signals representative of such an angular velocity may be used, for example, for photo-reconnaissance purposes, or may be operated upon within the apparatus, together with signals representative of the aircraft's groundspeed, or height, to obtain determinations of the aircraft's height above the ground, or groundspeed, respectively. In any such arrangement, for the determination of the aircraft's height, the aircraft's groundspeed may be measured by the apparatus in accordance with the present invention, in addition to measuring the angular velocity of the aircraft relative to the ground.

The object, the velocity of which may be required to be determined, may not be an aircraft, but any moving object, for example, a land vehicle, the velocity of which is required to be determined in relation to two orthogonal axes in a plane, by the apparatus receiving radiation from an associated source in the plane, the two optical units of the apparatus being in a different plane. With each such arrangement the apparatus operates at least substantially in any manner described above. Either the source, or the two optical units at least of the apparatus, are to move with the object in the same plane. When the two optical units move with the object they are mounted on the object. When the associated source is to move with the object, at least a part of the object may comprise the source, and the velocity of the object is determined in relation to two orthogonal axes in the plane of the object's movement. There are required to be planes of sight lines, extending from each two corresponding portions of the plane including the source, which planes of sight lines are parallel with each other, and are spaced apart by the predetermined distance along an axis parallel to the axis between the two optical units.

When the source is extensive it is required that the intensity of radiation varies over the area of the source. Alternatively, the source may not be extensive, and correlators may not be provided, but instead any other suitable form of comparing means. There may be only one measurement period in which the radiation is received only transiently by both of each relevant associated pair of detectors. Hence, in a measurement period, the detectors are arranged to receive radiation from portions of the plane including the source, which plane portions do not include the source, and so the detectors do not receive radiation from such plane portions. There may not be successive measurement periods in each of which the object's velocity can be determined.

The elongated, linearly-extending portions of the plane including the source, from which each detector is arranged to receive radiation, may not be straight, although each plane portion can be considered to have a longitudinal axis of symmetry.

The elongated, linearly-extending portions of the plane including the source, and from which each detector of an optical unit is arranged to receive radiation simultaneously, may not be equi-angularly inclined in relation to each other; and/or may not intersect each other at their mid-points.

When there are only two associated pairs of detectors in the two optical units, in relation to each optical unit the associated two elongated, linearly extending portions of the plane including the source possibly being inclined at right angles, the longitudinal axes of symmetry of two such portions of the plane may be coincident with the two orthogonal axes in relation to which the velocity of the object is to be measured, in any measurement period, the means to compute the object's velocity not requiring transformation means in this respect.

When the associated source is to move with the object, whether the object and the associated source are extensive or not, and irrespective of whether the source comprises at least part of the object, the apparatus determining the object's velocity either may be stationary, or the two optical units are to move in a manner corresponding to the object's movement. In any such latter arrangement, usually, in each measurement period, the two optical units are to be displaced by the same extent as the object, in a direction parallel to, and spaced from, the direction of the object's displacement. Hence, the apparatus is required to monitor the object's displacement, and feedback means is provided within the apparatus to control motive means to cause the apparatus to move in the appropriate manner. The object's velocity is determined by measuring the output of the motive means when the apparatus is closely tracking the object, the relationship between different possible outputs of the motive means and corresponding velocities of the optical units being predetermined.

When the apparatus is required to move with the object, or in a manner corresponding to the object's movement, it is not essential that all the constituent components of the apparatus are displaced together, for example, the means to compute the object's velocity, and possibly also the comparing means, may be spaced from, and may be arranged not to move with any displacement of, the two optical units, there being a suitable communications link between the moving and stationary parts of the apparatus.

The different comparing means, and possibly also the means to compute the object's velocity, may not be provided by a digital computer, but may be provided by any conveniently constructed device.

What we claim is:

1. Apparatus for measuring the velocity of an object in relation to two orthogonal axes in a first plane containing a radiation source, the apparatus including two spaced optical units disposed in a second plane, the object being movable in one of the first or second planes and the source or the two optical units in said one plane being movable with the object, each unit including at least two crossed detectors, the centers of the detectors in each unit being coincident and each detector being arranged to receive radiation instantaneously exclusively from an associated elongated, linearly-extending portion of the first plane, the two detectors of a unit being arranged to receive radiation from different associated portions of the first plane which are angularly oriented relative to each other, each detector having an associated detector in the other unit so as to form an associated pair of detectors which are arranged to receive radiation simultaneously from two, corresponding, parallel, spaced portions of the first plane and which are arranged such that longitudinal axes of symmetry of each of said two, corresponding, parallel portions of the first plane are spaced apart by the same predetermined distance along an axis parallel to a common axis between the two spaced optical units; separate comparing means for each pair of associated detectors for receiving signals representative of the detected intensities of radiation in a predetermined measurement period exclusively from their pair of associated detectors, each associated pair of detectors being arranged to receive during the measurement period radiation instantaneously from a plurality of two, corresponding, parallel portions of the first plane, and the comparing means determining from the signals received in the measurement period the delay between signals from the detectors of a pair corresponding to the same part of the same portion of the first plane; and means for computing the object's velocity in relation to said orthogonal axes from delays determined by the comparing means in the measurement period.

2. Apparatus as claimed in claim 1, wherein there are three associated pairs of detectors.

3. Apparatus as claimed in claim 2, wherein the associated portions of the first plane are equi-angularly oriented relative to each other.

4. Apparatus as claimed in claim 1, wherein the detectors are responsive to, and the associated source emits, infra-red radiation.

5. Apparatus as claimed in claim 1, wherein the two optical units are mounted on the object to move therewith, and the source is stationary, the source being sufficiently extensive such that radiation is received by the apparatus over a large number of measurement periods and such that the radiation has different intensities in said first place, and wherein each comparing means comprises a correlator.

6. Apparatus as claimed in claim 5, wherein the two optical units are arranged to be mounted on an aircraft which comprises the object the velocity of which is to be measured, and wherein the apparatus is arranged to receive radiation from the terrain over which the aircraft instantaneously is flying.

7. Apparatus as claimed in claim 6, wherein the means to compute the aircraft's velocity is arranged to supply signals to an associated navigational computer system.

8. Apparatus as claimed in claim 1, wherein each measurement period is divided into a plurality of subintervals, and wherein the comparing means includes means for forming the sums of the products of the signals produced by the associated detectors of a pair during said subintervals, and means for determining the time delay between the signals that produces the peak value of said sums.

9. Apparatus as claimed in claim 1, wherein the velocity of the object is determined from said delay without knowledge of the distance between the first and second planes.

10. Apparatus as claimed in claim 1, wherein the detectors have a narrow field of view, and all detectors have the same length-to-width ratio.

11. Apparatus as claimed in claim 1, wherein said angularly oriented portions of the first plane are at a right angle relative to one another.

12. Apparatus as claimed in claim 1 further comprising another optical unit disposed on said common axis intermediate the two spaced optical units, the third optical unit including detectors having coincident centers located on said axis, the detectors being arranged to receive radiation from portions of the first plane which are parallel to said parallel spaced portions of the first plane from which the detectors of the two spaced optical units receive radiation.

13. Apparatus adapted to be mounted on a moving object for measuring the velocity of the object relative to two orthogonal axes located in a plane spaced from the object, the plane including a source of radiation, the apparatus comprising two optical units spaced a predetermined distance apart, each unit having two crossed detectors, the centers of which are coincident and the coincident centers of the detectors of the two units being spaced apart on a common base line by said predetermined distance, the two detectors being arranged to receive radiation instantaneously exclusively from respective elongated linearly-extending portions of the plane which are angularly oriented relative to one another and to produce corresponding signals representative of the intensity of the radiation detected from such portions, each of the detectors of a first one of the units being associated with one of the detectors of the other unit so as to form first and second pairs of spaced associated detectors, the spaced associated detectors of each pair being arranged to receive instantaneously radiation from corresponding spaced parallel portions of the plane; first and second comparing means for said first and second pairs of associated detectors, respectively, for comparing the signals produced during a plurality of subintervals of a predetermined measurement period by the detectors of each pair, said signals corresponding to a plurality of said spaced parallel portions of the plane, and for determining the delay between signals corresponding to the same portion of the plane which are produced by the detectors of each pair; and means responsive to the delays determined by the comparing means for computing the velocity of the object relative to said orthogonal axes.

14. Apparatus as claimed in claim 13, wherein the two optical units each include a third detector for receiving radiation from an elongated linearly-extending portion of the plane which is angularly oriented with respect to the portions of the plane from which the two detectors receive radiation, and wherein said portions are equi-angularly oriented relative to one another.

15. Apparatus as claimed in claim 14, wherein said computing means includes axis transformation means for computing the velocity relative to said two orthogonal axes when the axes are not parallel to two of said linearly-extending portions of the plane from which the detectors receive radiation.

16. Apparatus as claimed in claim 13, wherein said object is an aircraft and said plane is the terrain over which the aircraft is flying, and wherein said radiation comprises infra-red radiation produced by said terrain.

17. Apparatus as claimed in claim 16, wherein said computing means comprises means for determining the velocity of the aircraft from said delays without knowledge of the height of the aircraft above the terrain.

18. Apparatus as claimed in claim 16, wherein said computing means comprises means for supplying signals to an associated navigational computer system of said aircraft.

19. Apparatus as claimed in claim 13, wherein said comparing means comprises means for forming the sums of the products of the signals produced by the associated detectors of a pair during said subintervals of the predetermined measurement period, means for determining the peak of said sums, and means for determining the delay by determining the subinterval of said predetermined measurement period that corresponds to said peak sum.

20. Apparatus as claimed in claim 13 further comprising means for varying the duration of successive measurement periods in accordance with the velocity of the object so as to maximize the accuracy of the velocity determination.

* * * * *

UNITED STATES PATENT AND TRADEMARK OFFICE
CERTIFICATE OF CORRECTION

PATENT NO. : 4,516,851
DATED : May 14, 1985
INVENTOR(S) : John C. Parker and James A. Blake It is certified that error appears in the above-identified patent and that said Letters Patent is hereby corrected as shown below:

Column 14, line 40: "place" should be --plane--.

Signed and Sealed this

Twenty-second Day of October 1985

[SEAL]

Attest:

DONALD J. QUIGG

Attesting Officer

*Commissioner of Patents and Trademarks—Designate*